United States Patent
Beard

(10) Patent No.: US 10,244,364 B1
(45) Date of Patent: Mar. 26, 2019

(54) SYSTEM AND METHOD FOR LOCATION DETERMINATION USING RECEIVED ADS-B ACCURACY DATA

(71) Applicant: uAvionix Corporation, Omaha, NE (US)

(72) Inventor: Paul Beard, Bigfork, MT (US)

(73) Assignee: uAvionix Corporation, Bigfork, MT (US)

(*) Notice: Subject to any disclaimer, the term of this patent is extended or adjusted under 35 U.S.C. 154(b) by 0 days.

(21) Appl. No.: 15/494,230

(22) Filed: Apr. 21, 2017

Related U.S. Application Data

(60) Provisional application No. 62/325,798, filed on Apr. 21, 2016.

(51) Int. Cl.
| | |
|---|---|
| *H04W 24/00* | (2009.01) |
| *H04W 4/04* | (2009.01) |
| *G01S 13/76* | (2006.01) |
| *G01S 19/03* | (2010.01) |

(52) U.S. Cl.
CPC ........... *H04W 4/046* (2013.01); *G01S 13/765* (2013.01); *G01S 19/03* (2013.01)

(58) Field of Classification Search
CPC .................................................. H04W 4/046
See application file for complete search history.

(56) References Cited

U.S. PATENT DOCUMENTS

| 2012/0262339 A1* | 10/2012 | Garcia | G01S 5/10 342/387 |
|---|---|---|---|
| 2017/0178519 A1* | 6/2017 | Farjon | G08G 5/0069 |

OTHER PUBLICATIONS

AC No. 20-165, Advisory Circular, U.S. Department of Transportation, Federal Aviation Administration, May 21, 2010, 67 pages.

* cited by examiner

*Primary Examiner* — Justin Y Lee
(74) *Attorney, Agent, or Firm* — Suiter Swantz pc llo

(57) ABSTRACT

A system and related methods for location determination aboard a subject vehicle not equipped with a GNSS-based positioning system receives position signals transmitted by non-satellite atmospheric vehicles and surface objects, which may include precise locations of the transmitting objects or position metrics associated with containment regions within which the transmitting objects should be to a particular certainty level. The received position signals may include ADS-B signals transmitted by proximate aircraft and facilities. The system may determine ownship location via multilateration of received position signals, via processing the received position metrics and corresponding containment regions, or via combining or correlating the two to determine accurate ownship location data of the subject vehicle.

16 Claims, 5 Drawing Sheets

200

202 Receiving, via a vehicle-based receiver, a plurality of position signals transmitted by at least four of an atmospheric vehicle and a ground-based object

204 Extracting from the plurality of position signals, via the vehicle-based receiver, at least one of a reported position and a position metric associated with the reported position, the reported position associated with at least one proximate object of the at least four of an atmospheric vehicle and a ground-based object

206 Determining, via the vehicle-based receiver, at least one location corresponding to the vehicle-based receiver based on one or more of the plurality of reported positions and the plurality of position metrics

*FIG. 4*

SYSTEM AND METHOD FOR LOCATION DETERMINATION USING RECEIVED ADS-B ACCURACY DATA

CROSS-REFERENCE TO RELATED APPLICATIONS

This application claims priority under 35 U.S.C. § 119(e) to provisional U.S. Patent Application Ser. No. 62/325,798 filed Apr. 21, 2016. Said provisional U.S. Patent Application Ser. No. 62/325,798 is herein incorporated by reference in its entirety.

TECHNICAL FIELD

The present disclosure relates generally to location determination, and, more particularly, to accuracy data provided in positioning signals for establishing the location of the transmitting object.

BACKGROUND

Aircraft positioning systems may provide a location of an aircraft (manned or unmanned) system in terms of either an absolute position or a relative position (e.g., relative to other aircraft, communication towers, or the like). However, modern positioning systems such as a Global Navigation Satellite System (GNSS) receiver, while precise, may negatively impact the size, weight, power, and cost (SWAP-C) metrics of smaller, unmanned, or more mission-restricted aircraft systems. In particular, compact aircraft such as unmanned aircraft systems (UAS), balloons, gliders, or light sport aircraft (LSA) may be unable to support GNSS-based hardware, e.g., due to design restrictions or insufficient resources.

Multilateration (MLAT) is an exemplary positioning technique that may be used to determine the location of an aircraft based on signals received from additional proximate aircraft. MLAT is a technique for locating an object based on the time difference of arrival (TDoA) of multiple synchronized signals. In general, MLAT may be used for either navigation or surveillance purposes. As a surveillance technique, for example, TDoA measurements of a signal originating at a single emitter (e.g. an aircraft) and received by multiple spatially separated receiving stations may be used to determine the location of the emitter. As a navigation technique, TDoA measurements of multiple synchronized signals originating from multiple spatially separated transmission sources (e.g. nearby aircraft) and received by a single receiver may be used to determine the location of the receiver.

Automatic dependent surveillance broadcast (ADS-B) signals may provide an exemplary set of signals for determining the location of a vehicle (e.g. a UAS) using alternative positioning systems such as MLAT. ADS-B is a surveillance technology in which ADS-B compliant vehicles determine their positions via satellite navigation (e.g. a GNSS) and broadcast their positions such that ground stations and/or other vehicles may receive the signals. In addition to position information, ADS-B signals transmitted by aircraft include additional information such as the accuracy at which the position of the aircraft is known. Further, in the United States, all aircraft operating in airspace classes A, B, C, and E will be required to be equipped with equipment to transmit ADS-B information. Similar requirements are being implemented globally such that the number of ADS-B compliant aircraft will continue to increase.

SUMMARY

In a first aspect, embodiments of the inventive concepts disclosed herein are directed to a system for determining ownship position data aboard an unmanned aircraft system (UAS) or other compact aircraft or vehicle. The system may include directional or omnidirectional antenna elements, and a receiver for receiving, via the antenna elements, secondary surveillance radar (SSR) signals or other like positioning signals transmitted by at least four proximate non-satellite objects, e.g., aircraft and atmospheric vehicles or surface vehicles and objects. The receiver may include processors for extracting from the received position signals position data or locations of the respective transmitting vehicles or objects. Based on the extracted position data, the processor may determine an ownship location, or a location of the receiving UAS/vehicle itself.

In a further aspect, embodiments of the inventive concepts disclosed herein are directed to a method for location determination via received position accuracy data. The method may include receiving, via a vehicle-based or aircraft-based receiver, position signals transmitted by at least four non-satellite atmospheric/surface vehicles or objects. The method may include extracting from the received position signals, via the receiver, reported positions of the transmitting vehicles or objects (which may or may not correspond to the actual positions of the objects) and position metrics corresponding to the accuracy of the reported positions. The method may include determining, via the receiver, at least one ownship location (e.g., a location of the receiving aircraft or vehicle) based on the extracted reported positions and position metrics.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a process flow diagram of an exemplary embodiment of a method for location determination according to the inventive concepts disclosed herein.

DETAILED DESCRIPTION OF EXEMPLARY EMBODIMENTS

Figure 1A:
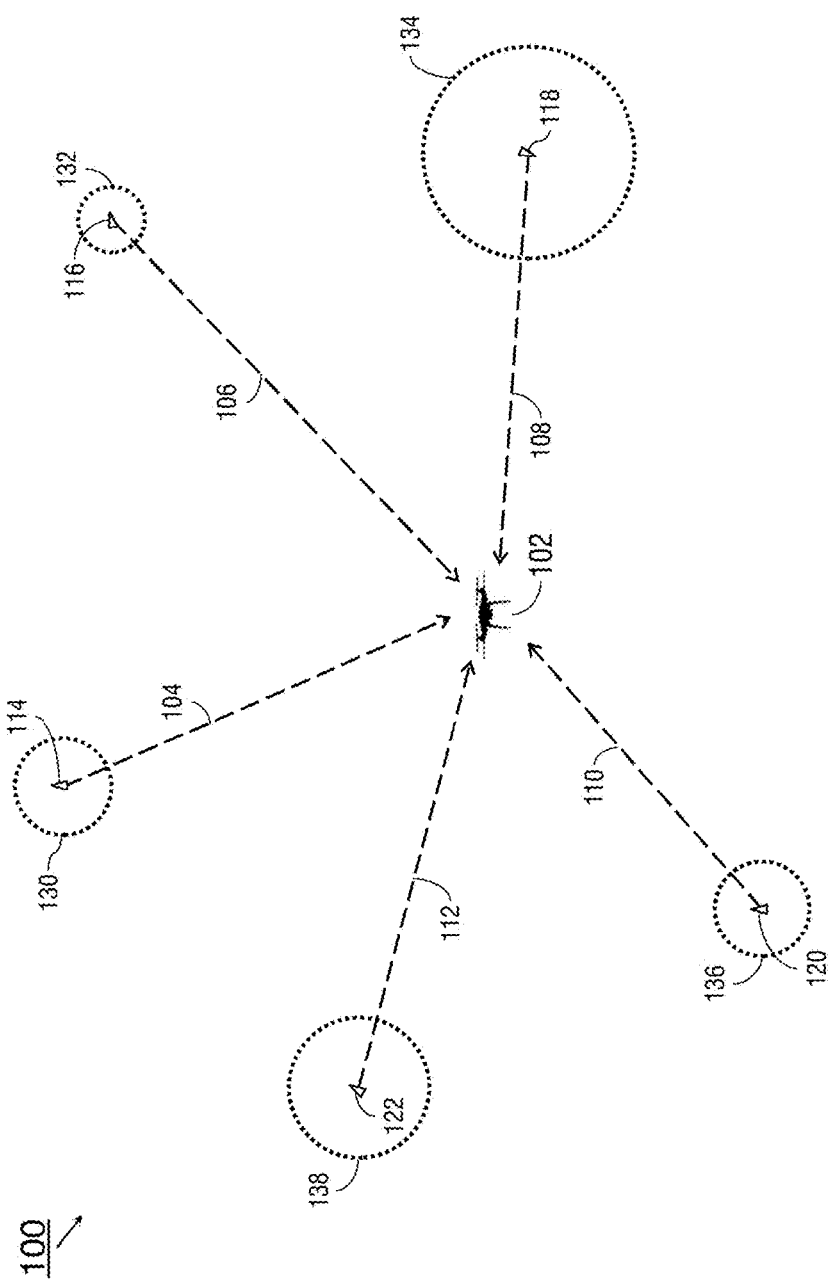
FIG. 1A is a highly diagrammatic view illustrating an exemplary embodiment of a system via which a vehicle receives position signals from proximate transmitting objects (PTO) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for location determination aboard a vehicle (e.g., an unmanned aircraft system (UAS), balloon, glider, light sport aircraft (LSA), or the like) lacking a satellite-based (e.g., GNSS, GPS, GLONASS, Galileo, Compass) positioning system. The system may receive position data via ADS-B signals transmitted by proximate objects (other aircraft, vehicles, or fixed objects) which may include precise locations of the objects or position metrics (e.g., accuracy or uncertainty data associated with less precise regions within which the proximate objects should be). The system can use both precise locations and position metrics in order to determine an accurate ownship location, e.g., a position of the receiving vehicle. For example, the vehicle may include an ADS-B compatible receiver for receiving and processing Mode-S transmissions to extrapolate a location of the subject vehicle without an onboard GNSS receiver.

Figure 1B:
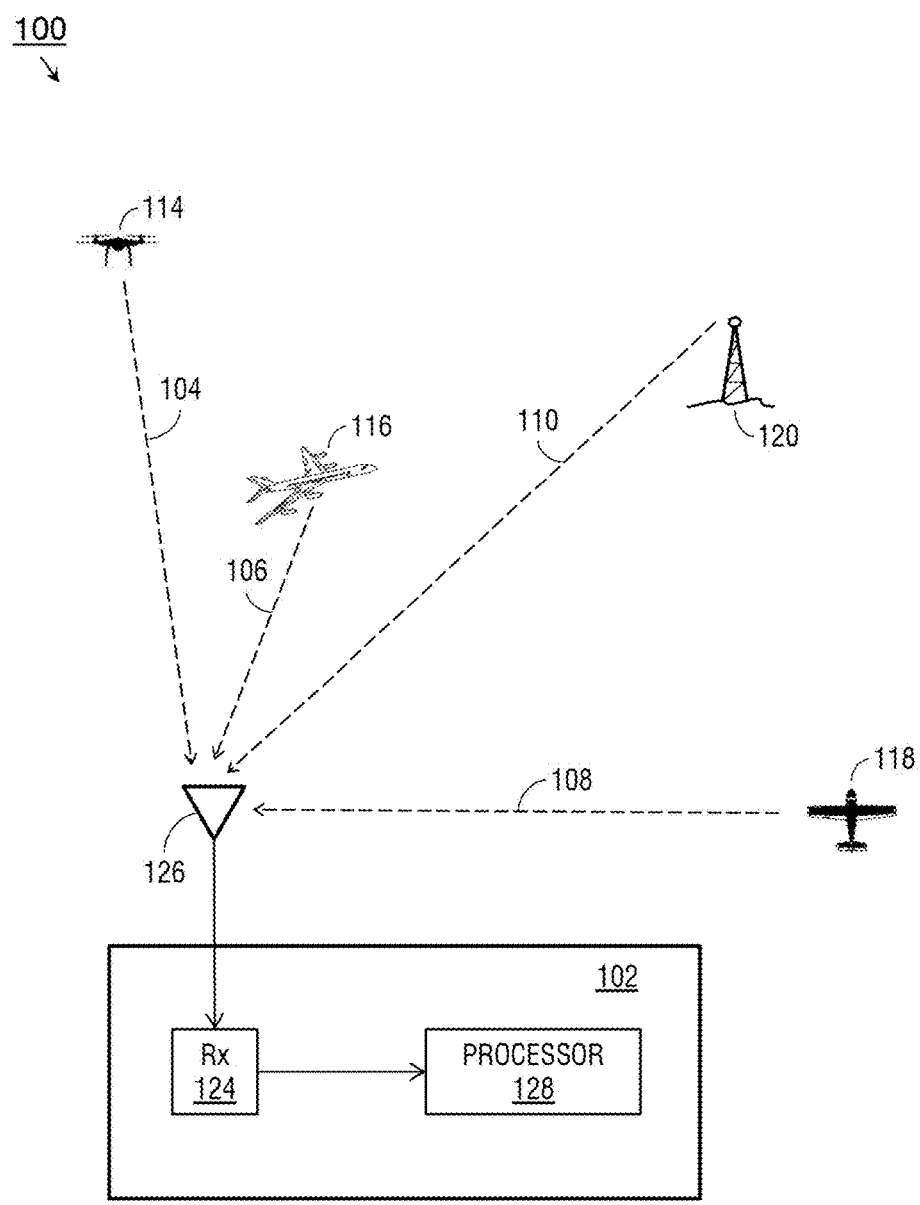
FIG. 1B is a highly diagrammatic view of the system of FIG. 1A.

Referring to FIGS. 1A and 1B, a subject vehicle 102 (including aircraft systems such as, e.g. a UAS, balloon, glider, LSA, or the like) may be equipped with a system 100 for location determination according to embodiments of the inventive concepts disclosed herein. Referring in particular to FIG. 1A, the system 100 aboard the subject vehicle 102 may receive transmitted position signals 104, 106, 108, 110, 112 from proximate transmitting objects 114, 116, 118, 120, 122 (PTO). Position signals 104, 106, 108, 110, 112 may include automatic dependent surveillance-broadcast (ADS-B) signals or other types of secondary surveillance radar (SSR) signals (e.g., TIS-B) by which the PTOs 114, 116, 118, 120, 122 transmit location information to ground control facilities or nearby aircraft equipped to receive and decode the information. Position signals 104, 106, 108, 110, 112 may include other positioning signals used by ground-based vehicles and objects, e.g., vehicle-to-vehicle (V2V), vehicle-to-everything (V2X), and other like surface network positioning signals. Position signals 104, 106, 108, 110, 112 may include raw location data (e.g., latitude, longitude, altitude, and the like) as well as position metrics corresponding to the integrity or accuracy of the position data. Position signals 104, 106, 108, 110, 112 may be associated with a variety of frequencies, including (but not limited to) 1090 MHz or 978 MHz signals associated with ADS-B compatible transceivers and transponders. PTOs 114, 116, 118, 120, 122 may include (but are not limited to) UAS of sufficient size or complexity to transmit ADS-B signals (114), commercial or civil manned aircraft (116, 118), ground-based vehicles, or stationary ground-based control facilities (120) having a fixed and/or georeferenced location. It is contemplated that PTOs 114, 116, 118, 120, 122 do not include navigational satellites as described above, nor do their respective position signals 104, 106, 108, 110, 112 include timing signals associated with navigational satellites and constellations, although the PTOs themselves may be capable of, or configured to, receive said satellite-based timing signals and determine their own position data therefrom.

Referring in particular to FIG. 1B, the system 100 may include a receiver 124 (e.g., an ADS-B receiver configured to receive and decode ADS-B In and ADS-B Out signals) and one or more antennas 126 or antenna elements. The antennas 126 may include directional, omnidirectional, or any other well-known antenna elements or combinations thereof. For example, the system 100 may include a combination of omnidirectional and directional antenna elements 126 to facilitate wide-angle scanning for available signals and narrow-angle reception of desired signals. The receiver 124 may include processors 128 (e.g., a radio element or software-defined radio) for processing received position signals 104, 106, 108, 110 to extract location data and position metrics. For example, the processors 128 may extract from the received position signals 104, 106, 108 location data and position metrics of the PTOs 114, 116, 118, 120, processing the location data and position metrics to determine an accurate position or location of the subject vehicle 102.

For example, referring back to FIG. 1A, the system 100 may determine location data of the subject vehicle 102 (e.g., ownship position data, or the location of one's "own ship") either in part or in full via multilateration (MLAT) positioning. MLAT is a hyperbolic technique whereby the location of the subject vehicle 102 may be determined by the intersection of hyperboloids defined by the time difference of arrival (TDoA) of position signals 104, 106, 108, 110, 112 simultaneously emitted from PTOs 114, 116, 118, 120, 122. The transit time of any position signal 104, 106, 108, 110, 112 received by the system 100 aboard the subject vehicle 102 may be directly related to a distance between the subject vehicle 102 and the originating PTO 114, 116, 118, 120, 122. Further, a determined TDoA of any two position signals 104, 106 simultaneously emitted from known locations (e.g., PTOs 114, 116 equipped with GNSS or similar satellite-based navigation systems configured to transmit position signals 104, 106 including georeferenced position data) may be processed to determine location information of the subject vehicle 102.

For example, the position signals 104, 106, 108, 110, 112 may include, in addition to position data of the transmitting PTOs 114, 116, 118, 120, 122, timestamp data corresponding to the signal transmission. Accordingly, the system 100 may process the location data and timestamp data to determine TDoA measurements. In particular, for a given PTO under ideal conditions, a single TDoA measurement may locate the PTO on a hyperboloid, two TDoA measurements may locate the PTO on a curve defined by the intersection of two hyperboloids, and three TDoA measurements may locate the PTO at a single point defined by the intersection of three hyperboloids; generally speaking, from any n received position signals, n-1 TDoA measurements may be made. In order to overcome errors associated with TDoA measurement, the system 100 may be an overdetermined system, using where possible four or more TDoA measurements in order to determine the ownship position of the subject vehicle 102 with high accuracy, e.g., to a point in space.

The system 100 may extract position metrics or other data associated with the content of the position signals 104, 106, 108, 110, 112 to determine the ownship location of the subject vehicle 102. The received position signals 104, 106, 108, 110, 112 may include metrics corresponding to the accuracy with which the positions or locations of respective PTOs 114, 116, 118, 120, 122 are known or can be determined. For example, rather than a precise location of a PTO 114, 116, 118, 120, 122, the received position signals 104, 106, 108, 110, 112 may include data defining a containment region 130, 132, 134, 136, 138 within which the location of a given PTO 114, 116, 118, 120, 122 can be determined to be to a particular level of certainty; the location of the subject vehicle 102 may be determined, in full or in part, based on containment region data.

Figure 2:
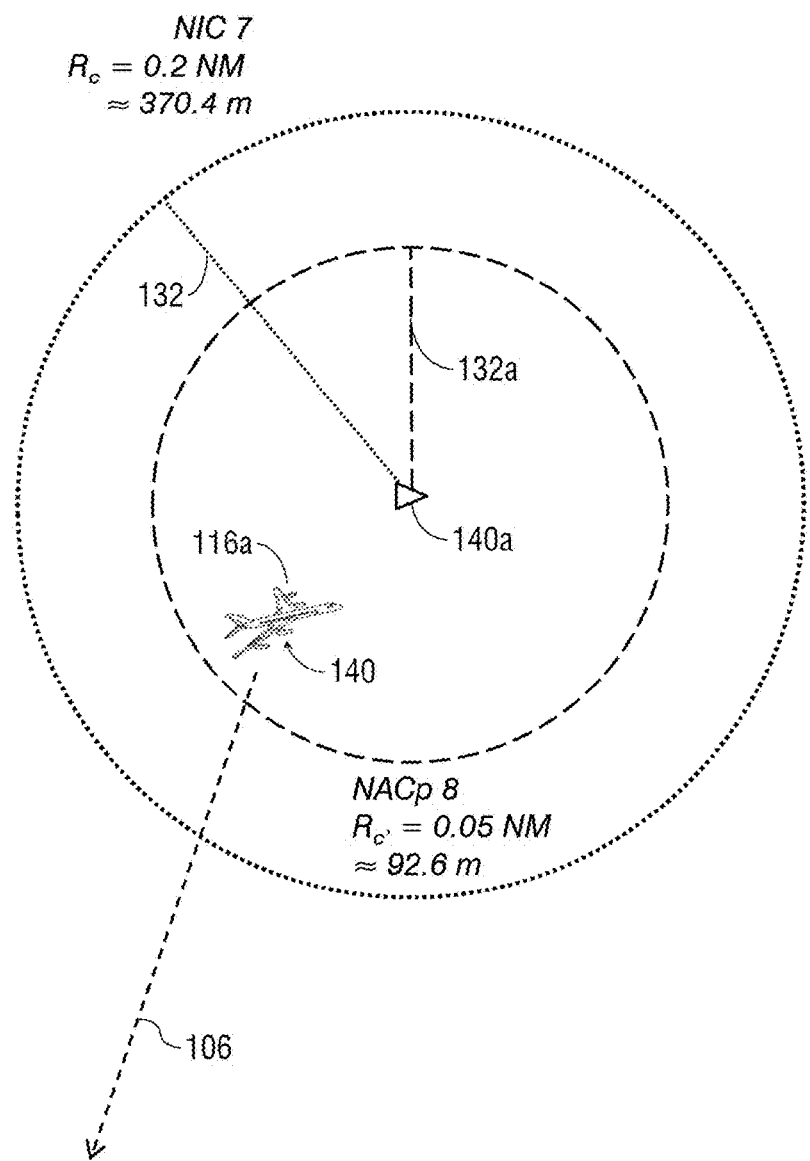
FIG. 2 is a highly diagrammatic view of metrics associated with the system of FIG. 1A.

Referring now to FIG. 2, the PTO 116a may be implemented and may be identical to the PTO 116 of FIG. 1A (or to any of the PTOs 114, 118, 120, 122 of FIG. 1A), except that the degree of precision to which the PTO 116a (e.g., an ADS-B compatible aircraft system) may determine its own location (e.g., via onboard GNSS or like satellite-based navigation systems for determining absolute position) may vary according to multiple factors, e.g., the installed hardware, flight conditions, weather and atmospheric conditions, satellite constellation errors, and the like. Depending on the operative conditions at any given time, the PTO 116a (occupying an actual position 140) may determine, and provide via a transmitted position signal 106, a reported position 140a that differs from the actual position 140. The PTO 116a may transmit, in the interest of facilitating accurate interpretation of the reported position 140a, one or more position metrics within the transmitted position signal 106. For example, position metrics may include, but are not limited to, position accuracy data (e.g., data associated with nominal performance of the GNSS receiver onboard the PTO 116a), position integrity data (e.g., associated with the level of trust in data generated by the GNSS receiver), or the like. The position signal 106 may include a Navigation Integrity Category (NIC) specifying an integrity-based containment region, e.g., a containment radius $R_c$ (132) associated with horizontal or vertical bounds of the actual position 140 relative to the reported position 140a. As defined by FAA Advisory Circular (AC) 20-165, a NIC value may be derived from an integrity output (e.g., horizontal protection level, horizontal integrity level, or the like) of GNSS hardware onboard the PTO 116a.

TABLE 1

| Navigation Integrity Category (NIC) Values | |
|---|---|
| NIC Value | Horizontal/Vertical Containment Radius ($R_c$) |
| 0 | $R_c$ UNKNOWN |
| 1 | $R_c$ < 20 nautical miles (NM) |
| 2 | $R_c$ < 8 NM |
| 3 | $R_c$ < 4 NM |
| 4 | $R_c$ < 2 NM |
| 5 | $R_c$ < 1 NM (1.852 km) |
| 6 | $R_c$ < 0.6 NM |
| 7 | $R_c$ < 0.2 NM |
| 8 | $R_c$ < 0.1 NM |
| 9 | $R_c$ < 75m |
| 10 | $R_c$ < 25m |
| 11 | $R_c$ < 7.5m |

Referring to TABLE 1, for example, a NIC value of 7 (where $R_c$ is less than 0.2 NM (370.4 m)) may be required to operate in an airspace class defined by 14 CFR § 91.225.

In some embodiments, position signal data may include a source integrity level (surveillance integrity limit; SIL). A SIL value may define the probability of, e.g., the reported horizontal position exceeding $R_c$ (containment radius 132) without alerting.

TABLE 2

| Source Integrity Level (SIL) Values | |
|---|---|
| SIL Value | Probability of exceeding $R_c$ |
| 3 | $\leq 10^{-7}$ per hour or sample |
| 2 | $\leq 10^{-5}$ per hour/sample |
| 1 | $\leq 10^{-3}$ (0.1 %) per hour/sample |
| 0 | $> 10^{-3}$ per hour/sample of UNKNOWN |

Referring to TABLE 2, for example, a minimum SIL value (e.g., 3, or a probability of no more than $10^{-7}$ per hour of sample of exceeding $R_c$) may be required to operate in an airspace class. Accordingly, data within the position signal 106 transmitted by the PTO 116a may indicate, according to an included NIC value, that the actual position (140) of the PTO 116a is known to be within one containment radius $R_c$ (132) of the reported position 140a.

In some embodiments, position signal data may include Navigational Accuracy Category (NAC) data associated with an estimated position uncertainty (EPU). For example, an ADS-B system onboard the PTO 116a may derive a NAC for Position (NACp) value from the accuracy output (e.g., horizontal figure of merit (HFoM)) of its position source (e.g., GNSS), the NACp value specifying with 95% certainty that the reported horizontal position information (e.g., latitude/longitude) is correct.

TABLE 3

Navigational Accuracy Category
for Position (NACp) Values

| NACp Value | Horizontal Accuracy Bound |
|---|---|
| 0 | EPU ≥ 10 NM (18.52 km) |
| 1 | EPU < 10 NM |
| 2 | EPU < 4 NM |
| 3 | EPU < 2 NM |
| 4 | EPU < 1 NM (1.852 km) |
| 5 | EPU < 0.5 NM |
| 6 | EPU < 0.3 NM |
| 7 | EPU < 0.1 NM |
| 8 | EPU < 0.05 NM (92.6 m) |
| 9 | EPU < 30m |
| 10 | EPU < 10m |
| 11 | EPU < 3m |

Referring to TABLE 3, for example, a minimum NACp value of 8 (where EPU is less than 0.05 NM) may be required to operate in an airspace class. Accordingly, the position signal data may include an EPU level and/or a NACp value defining a further or secondary containment region 132a ($R_c$), e.g., a radius around the reported position 140a within which the actual position 140 of the PTO 116a is known to be within 95% certainty.

Figure 3:
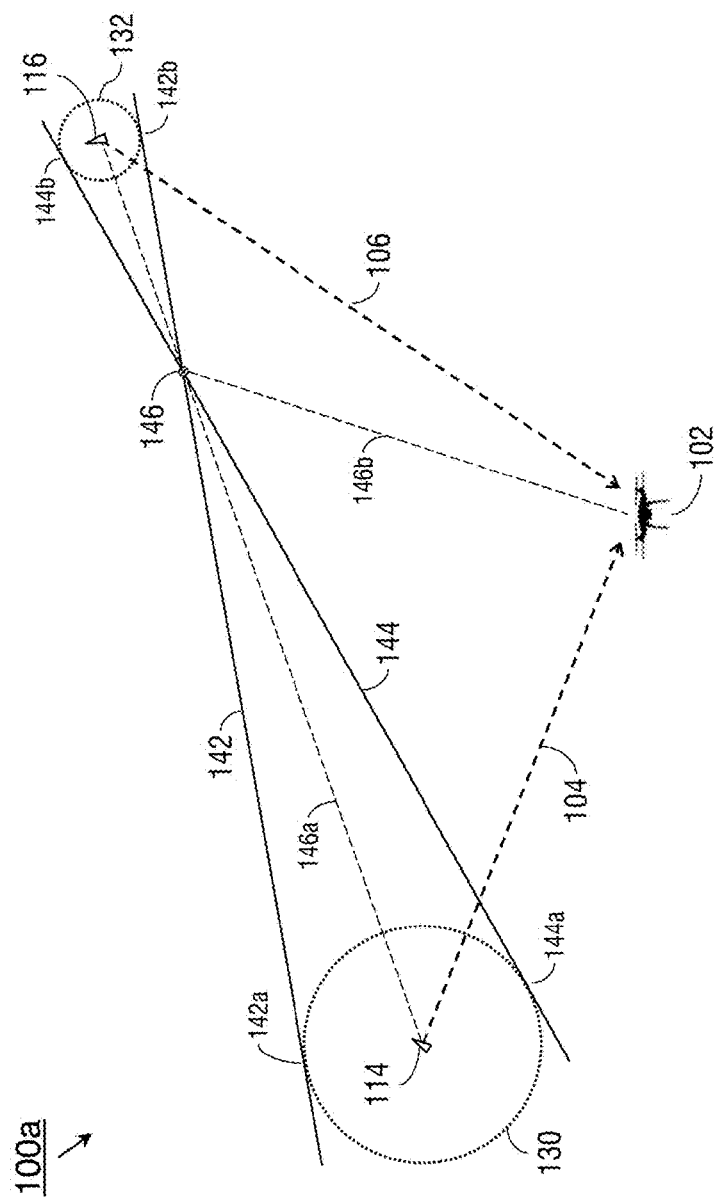
FIG. 3 is a highly diagrammatic view illustrating calculations based on containment regions made by the system of FIG. 1A.

Referring to FIG. 3, the system 100a may be implemented and may function similarly to the system 100 of FIG. 1A, except that the system 100a may determine an ownship location of the subject vehicle 102 based at least partially on calculations associated with containment regions 130, 132 provided by PTOs 114, 116 via position signals 104, 106. For example, the system 100a may calculate one or more common tangents (142, 144) simultaneously tangent to a pair of containment regions 130, 132 reported by PTOs 114, 116. Similarly, the system 100a may calculate an intersection point (146) of the one or more common tangents 142, 144 associated with the pair of containment regions 130, 132, one or more tangential points (142a-b, 144a-b) whereby the common tangents 142, 144 intersect the respective containment regions 130, 132, or a line (146a) connecting the reported positions of PTOs 114, 116 and the intersection point 146 of the common tangents 142, 144. Such calculations may be made for any pair of containment regions 130, 132, 134, 136, 138 as shown by FIG. 1A. In some embodiments, the system 100a may use the distance (146b) between the intersection point 146 and the subject vehicle 102 to facilitate determining the location of the subject vehicle 102. For example, as noted above, the precise positions of PTOs 114, 116 may be uncertain while their reported containment regions 130, 132 may be known with high precision, accordingly, calculations based on these containment regions 130, 132 may be performed to the same high level of precision. For example, calculation of the intersection point 146 may be used exclusively, or as a supplement to TDoA data based on the received position signals 104, 106, to determine ownship position data of the subject vehicle 102; calculation of the intersection point 146 may be based on reported position data, while determining the distance between the intersection point 146 and the subject vehicle 102 may be based on actual position data, e.g., the transmission times of position signals 104, 106. The system 100a may monitor the location of the calculated intersection point 146 over time, based on sequential position signals 104, 106 received from the PTOs 114, 116, and thus correlate reported position data from the PTOs 114, 116 with the actual positions of the PTOs. Through correlation of reported and actual position data, for example, any inaccuracies or variances between reported positions and actual positions (e.g., between the actual position of the subject vehicle 102 and the intersection point 146) may be averaged out or minimized over time; note that the actual position of each PTO 114, 116 can be anywhere within the associated containment region 130, 132 for a given measurement.

Referring to FIG. 4, an exemplary embodiment of a method 200 for determining the location of a vehicle-based receiver according to the inventive concepts disclosed herein may be implemented by the system 100 and may include method steps 202 through 206.

At the step 202, the system receives, via the vehicle-based receiver, a plurality of position signals transmitted by at least four proximate transmitting objects (PTOs). For example, the received signals may be ADS-B signals transmitted by proximate aircraft, atmospheric or surface vehicles, ground-based air traffic control facilities, or other like non-satellite objects.

At a step 204, the vehicle-based receiver extracts from the plurality of position signals reported position data and position metrics associated with the reported position data, the reported position data associated with the PTOs or transmitting vehicles. For example, the system may extract timestamp data associated with transmission times of the received position signals.

At the step 206, the vehicle-based receiver determines at least one ownship position (e.g., a location of the subject vehicle) based on one or more of the reported positions and/or position metrics. For example, the location determination may be based on containment regions (associated with, e.g., NIC, SIL, or NACp values), common tangents between a pair of containment regions, or intersections of the common tangents. Position data based on containment regions may be used in place of, or supplementary to, position data based on multilateration of the received position signals (e.g., based on transmission times). Position data may be determined by monitoring the reported positions, position metrics, common tangents, or intersections thereof over time.

I claim:

1. A system for determining position data associated with a vehicle, comprising:
   one or more antenna elements couplable to a subject vehicle;
   a receiver coupled to the one or more antenna elements and configured to receive, via the one or more antenna elements, a plurality of position signals transmitted by at least four of atmospheric vehicles and ground-based objects, the at least one receiver including a processor configured to:
   extract remote position data from the plurality of position signals, the remote position data associated with at least one of a first proximate object and a second proximate object of the at least four of atmospheric vehicles and ground-based objects and including one or more of:
   1) a plurality of reported positions including at least a first reported position of the first proximate object and a second reported position of the second proximate object;
   2) at least one position metric associated with the reported positions and including at least a) a first containment region associated with the first proximate object and b) a second containment region associated with the second proximate object;

and
  determine ownship position data corresponding to the subject vehicle based on one or more of the extracted remote position data, the reported positions, and one or more common tangents associated with the first containment region and the second containment region.

2. The system of claim 1, wherein the one or more antenna elements include at least one of a directional antenna element and an omnidirectional antenna element.

3. The system of claim 1, wherein the plurality of position signals includes at least one of an automatic dependent surveillance-broadcast (ADS-B) signal and a secondary surveillance radar (SSR) signal.

4. The system of claim 1, wherein:
  at least one position signal of the plurality of position signals includes timestamp data associated with a transmission time of the at least one position signal; and
  the processor is configured to determine the ownship position data based on multilateration of the at least one position signal.

5. The system of claim 1, wherein:
  the first containment region corresponds to a first probability that a first actual position of the first proximate object is within the first containment region; and
  the second containment region corresponds to a second probability that a second actual position of the second proximate object is within the second containment region.

6. The system of claim 1, wherein:
  the processor is configured to determine the ownship position data based on at least one intersection corresponding to two of the one or more common tangents.

7. The system of claim 1, wherein the position metric includes one or more of a NIC value, a SIL value, and a NACp value.

8. The system of claim 1, wherein the processor is configured to determine the ownship position data based on monitoring of the plurality of reported positions over time.

9. The system of claim 1, wherein the ownship position data includes one or more of:
  first ownship position data based on multilateration of the plurality of position signals;
  second ownship position data based on one or more of the plurality of reported positions and the at least one position metric.

10. The system of claim 1, wherein the at least four of atmospheric vehicles and ground-based objects include at least one of a manned aircraft, an unmanned aircraft system (UAS), a ground-based facility, and a transmitter associated with a fixed location.

11. A method for determining the location of a vehicle-based receiver, comprising:
  receiving, via a vehicle-based receiver, a plurality of position signals transmitted by at least four of atmospheric vehicles and ground-based objects;
  extracting from the plurality of position signals, via the vehicle-based receiver, at least one of a reported position and a position metric associated with the reported position, the reported position associated with at least one proximate object of the at least four of atmospheric vehicles and ground-based objects and the position metric including one or more containment regions, each containment region associated with the at least one proximate object;
  and
  determining, via the vehicle-based receiver, at least one location corresponding to the vehicle-based receiver based on one or more of the plurality of reported positions and a plurality of common tangents, each common tangent associated with two containment regions of the one or more containment regions.

12. The method of claim 11, wherein receiving, via a vehicle-based receiver, a plurality of position signals transmitted by at least four of atmospheric vehicles and ground-based objects includes:
  receiving, via the vehicle-based receiver, a plurality of ADS-B signals transmitted by at least four of atmospheric vehicles and ground-based objects.

13. The method of claim 11, wherein extracting from the plurality of position signals, via the vehicle-based receiver, at least one of a reported position and a position metric associated with the reported position, the reported position associated with at least one proximate object of the at least four of atmospheric vehicles and ground-based objects includes:
  extracting from the plurality of position signals, via the vehicle-based receiver, timestamp data associated with a plurality of transmission times of the plurality of position signals.

14. The method of claim 11, wherein determining, via the vehicle-based receiver, at least one location corresponding to the vehicle-based receiver based on a plurality of common tangents, each common tangent associated with two containment regions of the one or more containment regions includes:
  determining, via the vehicle-based receiver, at least one location corresponding to the vehicle-based receiver based on at least one intersection of the plurality of common tangents.

15. The method of claim 11, wherein the at least one location is a first location and determining, via the vehicle-based receiver, at least one location corresponding to the vehicle-based receiver based on one or more of the plurality of reported positions and a plurality of common tangents, each common tangent associated with two containment regions of the one or more containment regions includes:
  determining at least one second location corresponding to the vehicle-based receiver based on multilateration of the plurality of position signals;
  and
  determining, via the vehicle-based receiver, the at least one location by correlating the at least one first location and the at least one second location.

16. The method of claim 11, wherein determining, via the vehicle-based receiver, at least one location corresponding to the vehicle-based receiver based on one or more of the plurality of reported positions and a plurality of common tangents, each common tangent associated with two containment regions of the one or more containment regions includes:
  determining, via the vehicle-based receiver, at least one location corresponding to the vehicle-based receiver by monitoring the plurality of reported positions over time.

* * * * *